(No Model.)
S. A. & J. M. RINE.
FEED TROUGH.
No. 339,694. Patented Apr. 13, 1886.
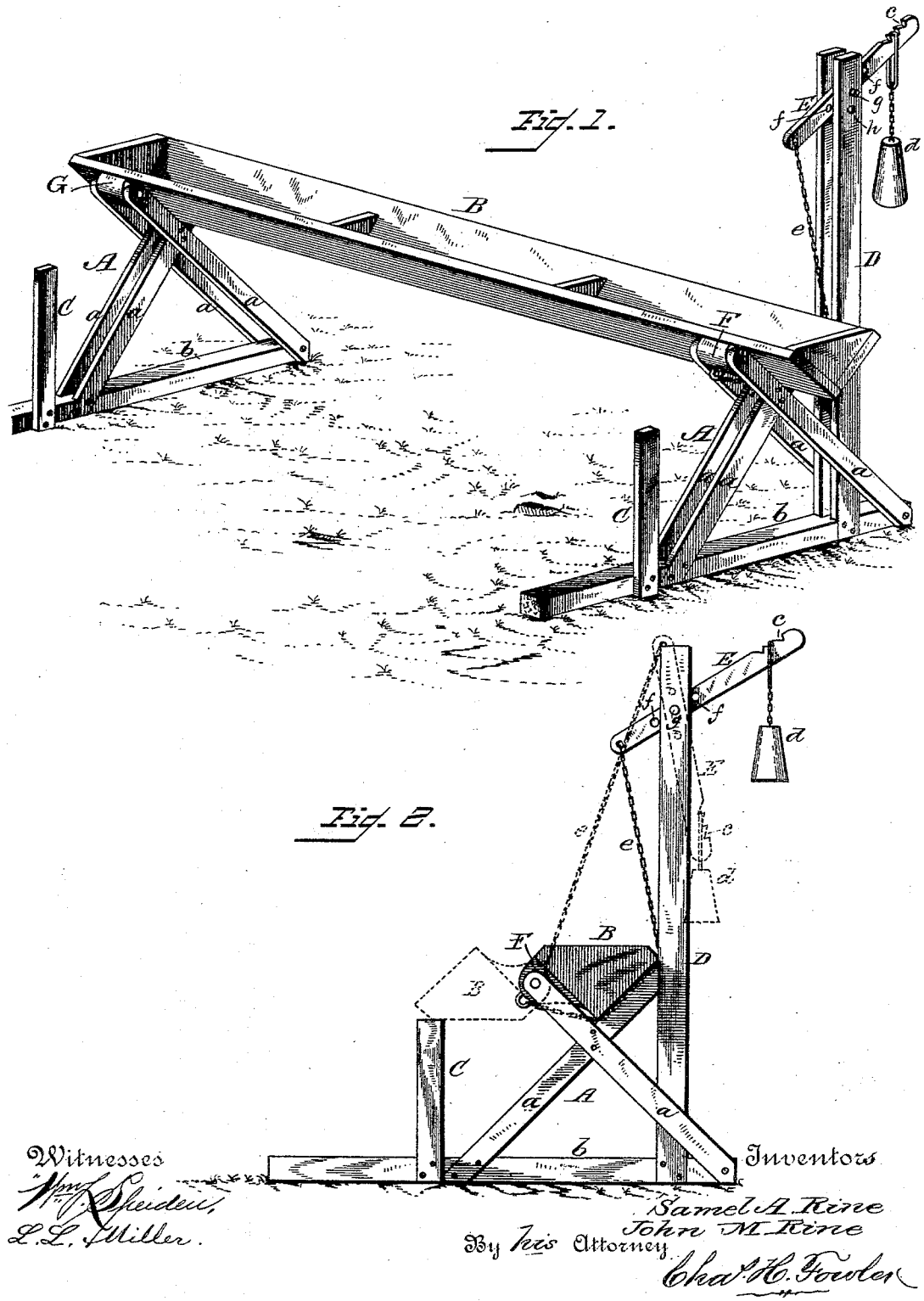

UNITED STATES PATENT OFFICE.

SAMEL A. RINE AND JOHN M. RINE, OF WEST CARLISLE, OHIO.

FEED-TROUGH.

SPECIFICATION forming part of Letters Patent No. 339,694, dated April 13, 1886.

Application filed February 23, 1886. Serial No. 192,899. (No model.)

*To all whom it may concern:*

Be it known that we, SAMEL A. RINE and JOHN M. RINE, citizens of the United States, residing at West Carlisle, in the county of Coshocton and State of Ohio, have invented certain new and useful Improvements in Feed-Troughs; and we do hereby declare that the following is a full, clear, and exact description of the same, reference being had to the annexed drawings, making a part of this specification, and to the letters and figures of reference marked thereon.

Figure 1 of the drawings is a perspective view of our invention, and Fig. 2 an end view showing the trough inverted in dotted lines.

The present invention has relation to that class of feeding-troughs supported on a frame in such manner as to enable it to turn upside down when not in use, to prevent any dirt or water from lodging in the trough, thereby keeping it clean for the next feed.

The object of the invention is to provide means whereby the trough will be inverted automatically when the feed therein is all consumed, which object I attain by the construction substantially as shown in the drawings and hereinafter described and claimed.

In the accompanying drawings, A represents suitable frames, to which are hinged the ends of a feeding-trough, B, of any of the usual forms.

The frames A are preferably constructed of the cross-braces a, attached at their lower ends to horizontal supports b, which have secured thereto upright posts C, for supporting the trough when inverted, as shown in dotted lines, Fig. 2.

A standard, D, is connected to one of the frames A, and extends up some distance above the same, and has pivoted to it a beam, E, provided with notches c at one end, to suspend therefrom a counterbalance-weight, d, and at its opposite end connected to the trough by a cord, rope, or chain, e. The chain at one end is attached to the end of the beam E, and extends down under the trough B, and its opposite end is connected to the front side thereof in any suitable manner.

In the present instance we have shown the chain as attached to a block, F, projecting from the front side of the trough and the block pivoted between the braces a, the block adding weight to the front side of the trough, to prevent it from being accidentally raised when in an inverted position, a similar weight or block, G, being also connected to the opposite end of the trough.

The beam E is formed with a series of holes, f, for the pin g, whereby the pivotal connection of the beam with the standard D may be changed, to lengthen or shorten the distance between the pivot-point and end of the beam, as found necessary.

If preferred, a hole, h, may be formed in the standard D, so that when the beam E is in position shown in dotted lines, Fig. 2, the hole will register with one of the holes f, and by inserting a pin or key in the holes the beam will be locked in such position, to prevent the trough from being turned back into position by any malicious person or from accident.

The weight is preferably adjustable on the beam, and is removable therefrom, and when the feed in the trough is all consumed the weight on the beam will overbalance the trough by virtue of the chain being attached to the front side and passing under it, and the tension on the chain will lift the trough up bodily, and when at right angles to its former position it will fall over by its own weight and rest on the posts C, as shown in dotted lines, Fig. 2, thereby rendering the trough automatic.

It is evident that the standard may be composed of one solid beam instead of two, as shown, and provided with an elongated slot, or bifurcated at its upper end to receive the notched beam; or the beam may be pivoted to the side of the standard, as preferred, these changes coming within ordinary mechanical skill, and not affecting the principle of our invention.

Having now fully described our invention, what we claim as new, and desire to secure by Letters Patent, is—

A feeding-trough hinged at its front side to suitable frames for supporting the trough when in use, and posts connected to the frames for supporting it in an inverted position, in combination with a standard provided with a pivoted beam, a counterbalance-weight suitably connected to one end of said beam, and a chain connected to the other end thereof and to the trough, as shown and described, and for the purpose specified.

In testimony that we claim the above we have hereunto subscribed our names in the presence of two witnesses.

SAMEL A. RINE.
JOHN M. RINE.

Witnesses:
MILTON MAGRUDER,
SILAS BONHAM.